United States Patent [19]

Tsuruta

[11] Patent Number: 4,491,405
[45] Date of Patent: Jan. 1, 1985

[54] CAMERA SUITABLE FOR FLASH PHOTOGRAPHY

[75] Inventor: Yuzo Tsuruta, Yokohama, Japan

[73] Assignee: Kabushiki Kaisha Sunpak, Tokyo, Japan

[21] Appl. No.: 491,578

[22] Filed: May 4, 1983

[51] Int. Cl.$^3$ .............................................. G03B 15/05
[52] U.S. Cl. ................... 354/416; 354/418; 354/459
[58] Field of Search ............................ 354/416–418, 354/459–460, 420, 422

[56] References Cited

U.S. PATENT DOCUMENTS

| | | |
|---|---|---|
| 3,921,184 | 11/1975 | Borowski et al. ............... 354/420 |
| 4,005,444 | 1/1977 | Uchiyama et al. ............. 354/416 X |
| 4,016,575 | 4/1977 | Uchiyama et al. ............. 354/416 X |
| 4,021,824 | 5/1977 | Uchiyama et al. ............... 354/418 |
| 4,096,491 | 6/1978 | Wagensonner et al. ........ 354/459 X |
| 4,158,492 | 6/1979 | Kitaura .......................... 354/416 X |

Primary Examiner—William B. Perkey
Attorney, Agent, or Firm—Neuman, Williams, Anderson & Olson

[57] ABSTRACT

The present invention has two photometric circuits, namely photointegrating circuits, one of them is for day light photography and other is for flash photography. Normally the photointegrating circuit for flash photography is retained inoperatable, but when a flash device is mounted on the camera of this invention, the photointegrating circuit for day light photography is made inoperatable and the photointegrating circuit for flash photography is made operatable.

5 Claims, 5 Drawing Figures

CAMERA SUITABLE FOR FLASH PHOTOGRAPHY

BACKGROUND OF THE INVENTION

The present invention relates to a camera suitable for photography using an electronic flash device.

Recent systems for photography using flash devices have had control means for enabling a photographer to obtain a photograph of correct exposure by merely pressing a shutter-control button in the same manner as for daylight photography, such control means being capable of automatically setting conditions for exposure by transmitting various data between a camera and the flash devices. The control means for controlling of the exposure can be classified into two types. According to one type, the aperture of the camera is controlled by transmitting the data on the amount of light from the flash device to the camera. The other type controls the amount of light of the flash device by transmitting the data on the amount of light from the photometric circuit of the camera to the flash device.

The present invention relates to a camera having control means of the latter type. The photometric circuit of the conventional cameras is provided with a photointegrating circuit comprising series connected photosensitive elements such as a phototransistor and an integrating capacitor to produce an output signal when the integrated value of the light reaches a predetermined value. For daylight photography, said output signal controls the closing of the shutter. For flash photography, on the other hand, operation of the flash device is terminated at the same time as the shutter is closed. It presents no particular problems in daylight photography but has been found to be defective for flash photography in that overexposure occurs when an object is in the near range.

SUMMARY OF THE INVENTION

An object of the present invention is to provide a camera which overcomes the above defect.

Another object of the present invention is to provide a camera which is free from overexposure even when the object is located near the flash device.

The camera according to the present invention incorporates a photointegrating circuit for daylight photography and a photointegrating circuit for flash photography respectively. The photointegrating circuit for daylight photography is a series circuit comprising a photosensitive element such as a phototransistor or a photodiode and a capacitor. The photointegrating circuit for flash photography consists of a series circuit comprising said photosensitive element and said capacitor and further a resistor.

The present invention features not only the incorporation of said two photointegrating circuits but it is also characterized in that when flash photography using the flash device is intended, the photointegrating circuit for daylight photography is automatically suspended and the other photointegrating circuit starts operation.

It is preferable that the operation is transferred from the photointegrating circuit for daylight photography to the circuit for flash photography when the ready-light of the flash device is turned on. This transfer may take place when the power source for the flash device is switched on.

The photointegrating circuits are not necessarily two separate circuits and they may have common elements. For example, it is possible to compose a circuit by providing a series connection of a photosensitive element, a resistor, and capacitor and provide a switching element, such as transistor, connected in parallel to the resistor, so that the circuit may be switched to one condition for daylight photography and switched to a second condition for flash photography.

DESCRIPTION OF THE PREFERRED EMBODIMENT

Figure 1:
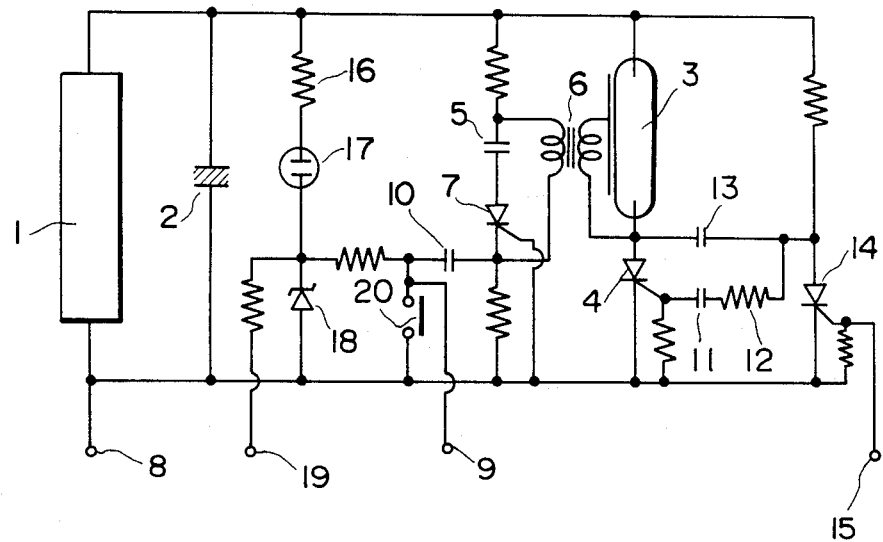
FIG. 1 shows the circuit diagram of the electronic flash device for use with the camera according to the present invention.

In the accompanying drawings, FIG. 1 shows the circuit diagram of a flash device to be used with a camera according to the present invention. The flash device is capable of automatically controlling the amount of light developed in each flash. A means for terminating the flash is provided of a series control type which comprises a switching element connected in series with a discharge tube. It may also be a parallel control type in which a switching element is provided to by-pass the discharge tube. In FIG. 1, reference numeral 1 denotes a DC high voltage power source comprising DC-DC converter, etc. Reference numeral 2 denotes a main capacitor which is charged by the power source 1 and supplies the power to a discharge tube 3. An SCR 4 as a switching element is connected in the discharge circuit of the main capacitor 2 and the discharge tube 3. The trigger circuit for activating the discharge tube 3 is a circuit of known construction which comprises a trigger capacitor 5, a trigger transformer 6 and an SCR 7. The cathode of the SCR 7 is connected to a capacitor 10 which is charged by the lighting or firing of a neon tube 17 and which discharges by the operation of a synchronizing switch 36 of the camera via terminals 8 and 9. The gate of SCR 4, which is connected in series with said discharge tube 3, is connected to the cathode of the discharge tube 3 via a capacitor 11, a resistance 12 and a commutating capacitor 13. The commutating capacitor 13 is connected between the anode of the SCR 4 and the anode of an SCR 14 as the switching element which turns on when the SCR 4 is turned off. The gate of the SCR 14 is connected to a terminal 15.

A series circuit comprising a resistor 16, the neon tube 17 and a Zener diode 18 is connected in parallel to the main capacitor 2. A terminal 19 is connected to the connecting point between the neon tube 17 and the Zener diode 18. The neon tube 17 is a ready-light which turns on when the charged voltage of the main capacitor 2 becomes sufficient for flashing. It is not necessarily a neon tube but may be any means which is structured to operate when the charged voltage of the main capacitor 2 reaches a predetermined value and which may then apply the flash ready signal voltage to the terminal 19. The capacitor 10 for operating the SCR 7 is connected to the Zener diode 18 in order to flash the discharge tube 3 only when the neon tube 17 is turned on. The reference number 20 denotes a test button for a flash test.

Figure 3:
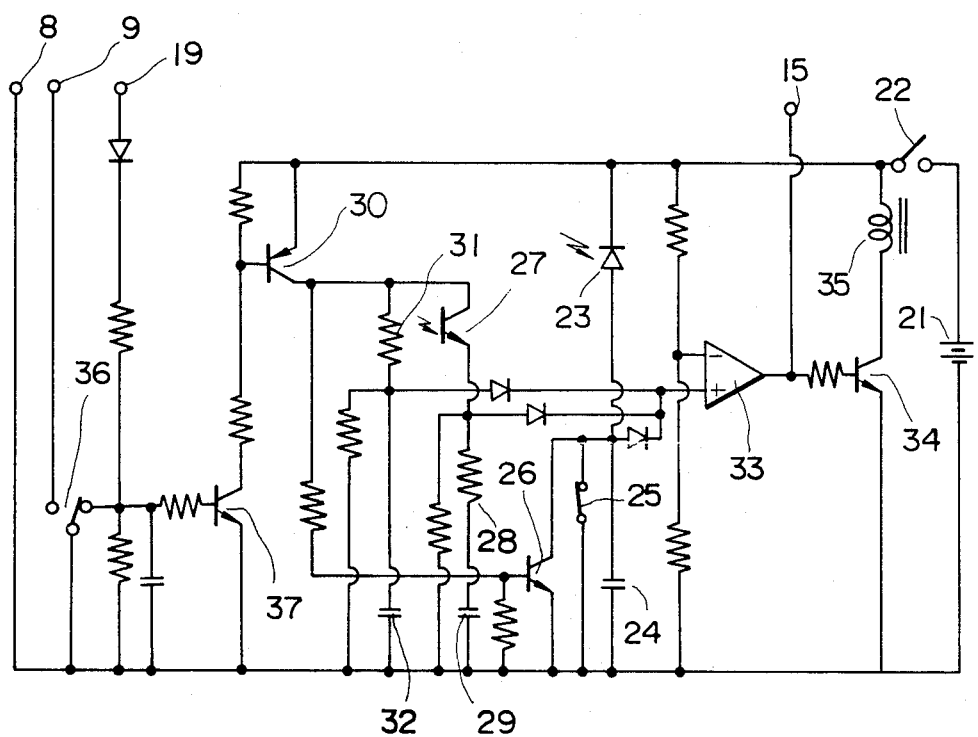
FIG. 3 shows the electric circuit of one embodiment according to the present invention.

FIG. 3 shows the circuit diagram of one embodiment according to the present invention, in which terminals having identical reference numbers as those in FIG. 1 are connected to their respective terminals. In FIG. 3 reference number 21 denotes a battery which is a power source for the operation of the circuit and which applies voltage to the circuit via a switch 22 which is switched on by pressing of the button for shutter. The photointegrating circuit for daylight photography comprises a photodiode 23 and an integrating capacitor 24. As is known in the prior art, the integrating capacitor 24 is connected in parallel with a switch 25 which is normally closed and which is opened when the button for shutter is pressed. The integrating capacitor 24 is further connected in parallel with a transistor 26 as a switching element. The transistor 26 is so connected that it turns on when voltage is applied to said terminal 19 and the shutter is opened. The photointegrating circuit for flash photography is a series circuit comprising a phototransistor 27, a resistor 28 and an integrating capacitor 29. This series circuit is connected to a collector of a transistor 30. The transistor 30 is provided to operate the photointegrating circuit for flash photography only when the voltage of the main capacitor 2 of the flash device shown in FIG. 1 reaches a predetermined value. A timer circuit comprising a resistor 31 and a capacitor 32 is connected in parallel to the photointegrating circuit for flash photography. The outputs from the photointegrating circuits for daylight photography and flash photography and from the timer circuit are connected to an input of a comparator 33. The circuitry is so structured that when one input to the comparator 33 from any one of the outputs from the photointegrating circuits reaches a value which is determined by the other input value of the comparator, the comparator 33 produces an output signal. The resistor 28 of the photointegrating circuit for flash photograghy is provided for adjustment when an object is in the near range. In operation, when the light reflected from the object and received by phototransistor 27 is increased, the current through the resistor 28 is also increased, and the voltage produced by the current which flows through the resistor 28 is added to the voltage of the integrating capacitor 29 (U.S. Pat. No. 3,519,879). The output end of the comparator 33 is connected in the prior art manner via a transistor 34 to operate a magnet 35 for closing the shutter. It is also connected to the terminal 15 which terminates the flash of said flash device.

A synchronizing switch 36 for firing the flash device is connected to the terminal 9 and is further connected to a base of a transistor 37 in order to short circuit its base circuit. The base of the transistor 37 is further connected to said terminal 19 so that it is applied with bias voltage therefrom when the synchronizing switch 36 turns on. The transistor 37 turns said transistor 30 on when the voltage charged in the main capacitor 2 reaches a predetermined value and when the synchronizing switch is turned on.

The operation of the embodiment mentioned above will now be explained.

As the flash device shown in FIG. 1 is mounted on the camera shown in FIG. 3, the terminals 8, 9, 15 and 19 are respectively connected. As the power source switch (not shown) for the flash device is turned on, the main capacitor 2 is charged by the power source 1. When the voltage reaches a predetermined value, the neon tube 17 is turned on and a voltage is generated at the zener diode 18 to thereby apply a certain voltage to the base of the transistor 37 via the terminal 19. However, the transistor 37 will not operate because the base of the transistor 37 is short circuited by the synchronizing switch 36. The camera is ready for photographing when the neon tube 17 is turned on. When the shutter button is pressed, the switch 22 is turned on while the switch 25 is turned off, whereby the photointegrating circuit for daylight photography is activated and the shutter starts to open. Charging of the integrating capacitor 24 starts but if the surrounding light is insufficient, as in the case of flash photography, the integration proceeds slowly. When the shutter is completely opened, the synchronizing switch 36 is switched to short circuit the terminals 8 and 9. At the same time, the short circuit of the base of the transistor 37 is released, so that the transistor 37 is turned on by the voltage from the Zener diode 18. As the terminal 18 is connected to the terminal 9, the capacitor 10 discharges and thereby makes the discharge tube 3 discharge as the SCR 7 is turned on. This, by itself is known in the prior art. On the other hand, the transistor 37 located in the camera is turned on to turn the transistor 30 on and to operate the photointegrating circuit for flash photography and the timer circuit starts operating. At the same time, the transistor 26 connected in parallel to the integrating capacitor 24 is turned on to make the integrating capacitor 24 discharge and to stop the operation of the integrating circuit for daylight photography. The light reflected from the object is thus converted into an electric signal by means of the phototransistor 27 and the integrating capacitor 29 is charged. When the charged value reaches to a predetermined value, an output signal is produced from the comparator 33 to thereby turn the SCR 14 of the flash device on via the terminal 15. As a consequence, the capacitor 13 for commutation discharges and the SCR 4 turns off. Therefore the flash from the discharge tube 3 terminates.

For daylight photography, photometry is done in an ordinary manner using the photodiode 22 and the integrating capacitor 23. The timer circuit is so arranged that the shutter can be closed after a certain period of time, instead of being left open, even if the light from the discharge tube 3 is insufficient as the object is in the far range.

Figure 4:
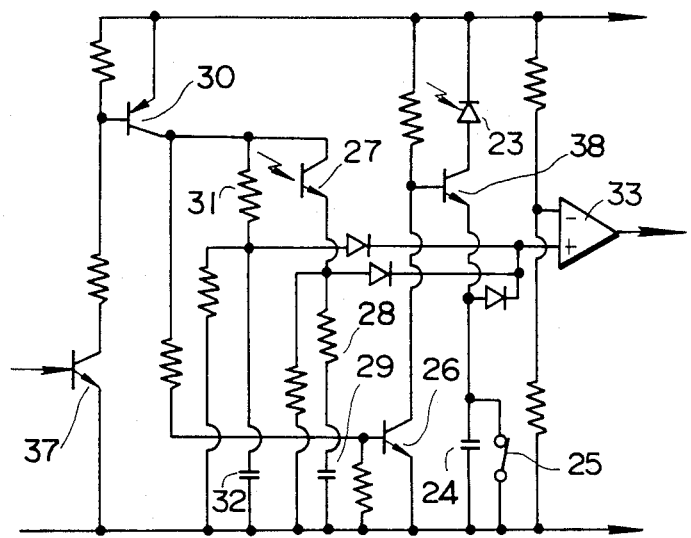
FIG. 4 shows the electric circuit of another embodiment according to the present invention.

FIG. 4 shows another embodiment wherein the photointegrating circuit for daylight photography is stopped by means of transistor 38 which acts as a switching element connected between the photodiode 23 and the integrating capacitor 24. All the other parts are indentical with those shown in FIG. 3 and thus are partly omitted here and the identical parts are given the same reference numbers respectively without description. The transistor 38 is normally turned on to make the photointegrating circuit for daylight photography in operation but is turned off when the neon tube 17 of the flash device is turned on to thereby make said photointegrating circuit inoperatable. It is apparent that the transistor 38 is turned off as the transistors 37, 30 and 26 are turned on. At such times, the photointegrating circuit for flash photography will operate by means of the transistor 30 in the manner mentioned above.

Figure 5:
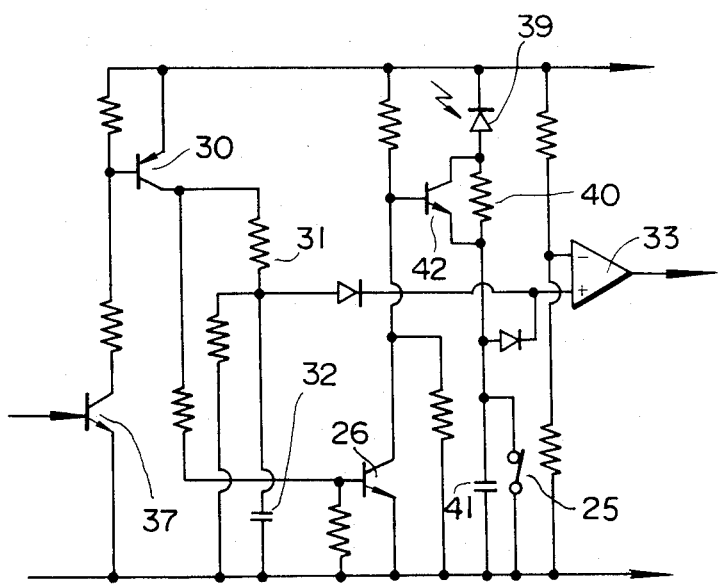
FIG. 5 shows the electric circuit of still another embodiment according to the present invention.

FIG. 5 shows still another embodiment wherein a photointegrating circuit for daylight photography also acts as the photointegrating circuit for flash photography. The circuit is composed of a series circuit of a photodiode 39, a resistor 40 and an integrating capacitor 41 and a transistor 42 which is connected in parallel with the resistor 40. The transistor 42 acts as a switching element of the circuit for switching between daylight and flash photographies. The transistor 42 is normally kept turned on for daylight photography and integrates without using the resistor 40. For flash photography, in other words, when the neon tube 17 of the flash device is turned on, the transistor 42 is turned off by means of the transistors 30 and 26 and integration is conducted through the resistor 40. The rest is identical with the embodiment shown in FIG. 3.

Figure 2:
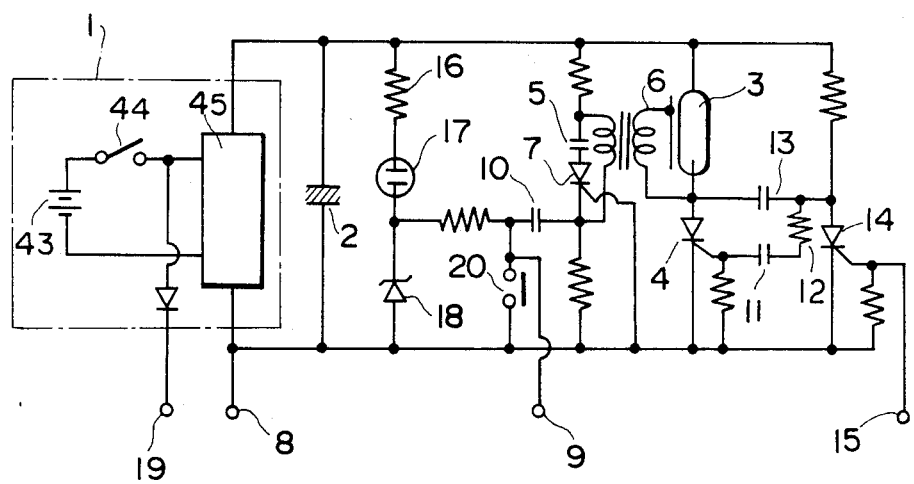
FIG. 2 shows the circuit diagram of another electronic flash device for use with the camera according to the present invention.

FIG. 2 shows another embodiment of a flash device for use with the camera according to the present invention. The device is identical with the one shown in FIG. 1 except that the method of taking out the signal for turning the transistor 37 on. With this flash device, the photointegrating circuit for day light photography is switched to for flash photography when the photointegrating circuit is switched on by turning the power source on. For this purpose, it is so structured that the voltage of the battery 43 is applied to the terminal 19 when the switch 44 for power source which is connected between the battery 43 and the DC-DC converter 45 is turned on. Therefore, when the flash device is mounted on the camera and the switch 44 for the power source is turned on for activating the flash device, the voltage of the battery 43 is applied to the base of the transistor 37. However, as the base circuit of the transistor 37 is short circuited by the switch 36, it is not operative until the switch 36 is turned on. The camera will be operated as mentioned above and only when the shutter is completely opened and the switch 36 is switched, the circuit is turned on.

What is claimed is:

1. A photographic camera capable of using an electronic flash device, said camera including a photointegrating circuit for daylight photography which comprises a photosensitive element and an integrating capacitor, a photointegrating circuit for flash photography which comprises a photosensitive element, a resistor and an integrating capacitor, a terminal to which a voltage is applied from a flash device, a synchronizing switch for flashing the flash device, and a switching means which operates during operation of said synchronizing switch and in response to a voltage applied from a flash device to said terminal to disable said photointegrating circuit for daylight photography inoperable and to cause operation of said photointegrating circuit for flash photography.

2. The camera as claimed in claim 1 wherein said switching means includes a transistor which is normally kept turned off by means of said synchronizing switch and which is turned on by the operation of the synchronizing switch when the shutter is fully opened, and which changes from the photointegrating circuit for daylight photography to that for flash photography.

3. The camera as claimed in claim 2 wherein the switching means is provided with a switching element which is connected in parallel with the integrating capacitor of the photointegrating circuit for daylight photography and which switches on when said transistor is switched on by the synchronizing switch.

4. The camera as claimed in claim 2 wherein the switching means is provided with a switching element which is serially connected between the photosensitive element and the integrating capacitor of the photointegrating circuit for daylight photography and normally kept turned on and which turns off when said transistor is turned on by the operation of the synchronizing switch.

5. A photographic camera capable of using an electronic flash device, said camera including a photointegrating circuit which comprises a series circuit of a photosensitive element, a resistor and an integrating capacitor, a switching element which is connected in parallel to said resistor and usually kept in a closed condition, a terminal to which a voltage is applied from a flash device, a synchronizing switch which flashes the flash device, and a switching means which operates said switching element to an open condition in response to a voltage applied from a flash device to said terminal when the synchronizing switch is operating.

* * * * *